(12) United States Patent
Hayes et al.

(10) Patent No.: US 8,416,488 B2
(45) Date of Patent: Apr. 9, 2013

(54) DISPLAY DEVICE

(75) Inventors: Robert A. Hayes, Hong Kong (CN);
Andrea Giraldo, Den Bosch (NL);
Anthony John Slack, Lorgues (FR);
Johannes Bokke Feenstra, Nuenen
(NL); Roy Van Dijk, Eindhoven (NL);
Ivar Schram, Weert (NL)

(73) Assignee: Samsung LCD Netherlands R & D Cneter B.V., Eindhoven (NL)

( * ) Notice: Subject to any disclaimer, the term of this patent is extended or adjusted under 35 U.S.C. 154(b) by 91 days.

(21) Appl. No.: 12/814,803

(22) Filed: Jun. 14, 2010

(65) Prior Publication Data

US 2010/0321760 A1 Dec. 23, 2010

Related U.S. Application Data (63) Continuation-in-part of application No. PCT/EP2009/055084, filed on Apr. 27, 2009.

(30) Foreign Application Priority Data

Apr. 28, 2008 (GB) ................................. 0807667.1

(51) Int. Cl.
*G02B 26/00* (2006.01)
*G02B 26/02* (2006.01)
(52) U.S. Cl. ....................................... 359/290; 359/228
(58) Field of Classification Search .................. 359/245, 359/253, 254, 290–292, 316, 228, 259, 320, 359/321, 665; 430/48, 321–325, 330; 345/41, 345/60, 84, 204
See application file for complete search history.

(56) References Cited

U.S. PATENT DOCUMENTS

| 6,865,012 B2 * | 3/2005 | Liang et al. ................... 359/296 |
| 2008/0297880 A1* | 12/2008 | Steckl et al. .................. 359/291 |
| 2009/0169806 A1 | 7/2009 | Lo et al. |
| 2010/0108232 A1* | 5/2010 | Chen et al. ...................... 156/60 |

FOREIGN PATENT DOCUMENTS

| JP | 2004-043674 A | 2/2004 |
| JP | 2006-251085 A | 9/2006 |
| WO | 03/071346 A1 | 8/2003 |
| WO | 2004/104670 A1 | 12/2004 |
| WO | 2005/038764 A | 4/2005 |
| WO | 2005/098797 A2 | 10/2005 |
| WO | 2006/011101 A1 | 2/2006 |
| WO | 2006/017129 A | 2/2006 |

OTHER PUBLICATIONS

United Kingdom Search Report for GB0807667.1, mailed on Sep. 1, 2008.
International Search Report and Written Opinion for PCT/EP2009/055084, mailed Oct. 6, 2009.

\* cited by examiner

*Primary Examiner* — Tuyen Tra
(74) *Attorney, Agent, or Firm* — BainwoodHuang (57) ABSTRACT

A display device comprising picture elements, which are constituted by electrowetting elements having at least one first fluid and a second fluid immiscible with each other within a space between a first support plate and a second support plate, the second fluid being electro-conductive or polar. The first fluid in each element is at the side of the first support plate confined by element walls, and the second fluid is shared by a plurality of picture elements, characterized by a preventer for preventing first fluid portions from being expelled from its confinement when forces other than electrowetting forces are exerted on this fluid.

28 Claims, 9 Drawing Sheets

DISPLAY DEVICE

CROSS REFERENCE TO RELATED APPLICATIONS

This Patent Application is a continuation-in-part of International Patent Application No. PCT/EP2009/055084 filed on Apr. 27, 2009, entitled, "DISPLAY DEVICE" which claims priority to GB0807667.1 filed Apr. 28, 2008, the contents and teachings of which are hereby incorporated by reference in their entirety.

FIELD OF THE INVENTION

The invention relates to a display device comprising picture elements, which are constituted by electrowetting elements having at least one first fluid and a second fluid immiscible with each other within a space between a first support plate and a second support plate, the second fluid being electro-conductive or polar, whereby the first fluid in each element is at the side of the first support plate confined by element walls and the second fluid is shared by a plurality of picture elements.

BACKGROUND OF THE INVENTION

Such a display device, meanwhile known as an electrowetting display (EWD), may be used in a number of apparatuses such as a portable computer, for example a notebook or a game computer or a handheld computer, such as personal digital assistant (PDA). Such a display may also be used in a watch or in a digital photo display. Since an electrowetting display combines many attractive properties such as high colour brightness, video speed, and low power consumption, it constitutes a substantially better alternative for the well known and nowadays widely used liquid crystal display (LCD). Because of said combination of properties the electrowetting display is very suitable for use in smaller handheld apparatuses, like mobile phones, digital picture- or video camera's etc.

An electrowetting display is known, for example from PCT patent application WO 03071346. As described therein, this display comprises a large number of electrowetting elements, which constitute the display picture elements (pixels). Each element is provided with a first fluid and a second fluid, which fluids are immiscible. In the height- or thickness-direction of the display the fluids are confined by a first support plate, or base plate, and a second support plate. Both the first and the second support plate may be common to all electrowetting elements. At its inner side the first support plate is provided with a transparent electrode, which is covered by a (hydrophobic) layer less wettable to the second fluid. The first fluid is for instance oil and the second fluid may be water. In a first state, when no voltage is applied between the electrode and the second fluid, the first fluid adjoins the first support plate, i.e. covers the hydrophobic layer, whilst the second fluid adjoins the second support plate. When a voltage is applied, the first fluid layer moves aside or breaks up into small droplets. Since parts of the second fluid now penetrate the first fluid layer, the electrowetting element becomes partly transparent so that it can transmit light. The first fluid of an element is confined by the first support plate and, in the lateral direction, by element walls.

Several embodiments of this basic design of the electrowetting display are possible. For example the viewing side, i.e. the side facing an observer, may be the side of the second support plate so that the first support plate may constitute a base plate, and the electrode arranged on this plate may be transparent or reflective. The transparent electrode may be a layer of indium tin oxide (ITO), or a very thin layer of an electrically conductive material or a so-called open layer, i.e. a layer provided with holes. The viewing side may also be the side of the first support plate. The element walls may protrude from the first support plate and/or from the second support plate. The electrowetting display may be configured to spatially modulating, according to the image to be displayed, either a transmitting beam or a reflected beam. The electrowetting display may also include more than two supporting plates.

As described in PCT patent application WO 2004104670, the height of the element walls is substantially smaller than the width of the gap between the supporting plates. This measure provides the advantage that the brightness of the pixels will be enhanced, especially when the pixel size is reduced to increase the definition of the display. In addition it provides the advantage that the second, conducting, fluid portions of the individual elements are interconnected across the whole display. It is true that the height of the first fluid upon contraction may in fact be larger than the actual wall height. However, it has been confirmed experimentally that in the contracted shape the oil remains within the pixel.

Although the concept of the electrowetting display has proven to be very feasible, it has turned out that unexpected problems may occur. It has been established that some of the manufactured displays do not satisfy the specifications, and also that a display, which passed manufacture control may deteriorate during use so that its performance becomes unacceptable. Neither these problems nor their cause have been reported up to now.

SUMMARY OF THE INVENTION

It is an object of the invention to reveal the cause of the problems and to provide solutions for the problems. This results in a display device that is characterised by a preventer for preventing first fluid portions from being expelled from its confinement when forces other than electrowetting forces are exerted on this fluid.

A first fluid portion could be expelled from its confinement within the element walls on the first support plate by flowing over an element wall or by being displaced to and adhering at the second support plate. It has been conceived that downwards movement of the second support plate due to pressure exerted on this plate, for example by a finger, may cause the following effects. The second support plate will push the second fluid down and this fluid can expel the first fluid from its confinement. If the distance between the support plates, i.e. the gap width becomes small enough, the fluid will even adhere to the second support plate. This effect may be called the lowered ceiling effect. Moreover, a pressure pulse exerted on the second support plate may create a shock wave, which propagates through the fluids and may even be magnified and which may cause a first fluid portion to flow over an element wall. This may be called a tsunami effect. Both effects result in at least a portion of first fluid being expelled from their confinement in at least some elements.

As described in PCT patent application WO 2005098797, the performance of an electrowetting display is critically dependent on the amount of first fluid, e.g. oil, in the elements. In particular for control of grey levels of the elements the oil dose is very critical. Already if an amount of less than 20%, for example 10% of the oil is removed from an electrowetting element, this element and its neighbour element that receives the expelled oil will no longer perform the required optical switching so that the optical transfer function is impaired. If a larger amount of oil is expelled from an electrowetting element this element will be "lost" for the display. As is known in the art, the human eye is very critical and will notice even a single missing pixel in a display. In practice more than one pixel may get lost when pressure is exerted on the display. The number of missing pixels is determined by the type of pressure. In case of local pressure, for example by a finger or a pen-like element on a touch screen, a limited number of pixels will get lost. If a larger area of the display is pressed, a substantially larger number of electrowetting elements may be destroyed.

During manufacture of an electrowetting display, also after the array of elements has been finished, elements may be destroyed during subsequent process steps, such as filling, sealing, scribing, breaking, addition of layers for the assembly process or layers to improve the optical performance. Moreover, the addition of reflector means and front- or backlight means may also be attended with element destruction. Finally, during transport of the display elements may also be destroyed due to mechanical shocks or other forces, which temporarily cause a change of the gap width. By providing an electrowetting display with a preventer according to the invention the oil, or another first fluid, can be retained in the elements on the first support plate and the display becomes more resistant against pressure and shocks. A preventer may be e.g. a component arranged in the space of an electrowetting element or an electronic circuit. The display device may have one preventer or a plurality of preventers of the same type or of different types.

The element walls confining the first fluid to an electrowetting element may have the form of a hydrophilic layer on the first support plate. The element walls may also be material walls extending from the first support plate and having a height perpendicular to a surface of the first support plate adjoining the first fluid, the height being smaller than the distance between the plates.

The embodiments of the new electrowetting display can be divided into several classes. A first class of embodiments is characterised in that the preventer is constituted by a component arranged at the inner side of the second support plate, which component prevents the first fluid from attaching to this plate.

Since the inner side of the second support plate repels the first fluid upon a downward movement of the top plate, the first fluid is pressed downwards via pressure from the second fluid and does not leave the element. When the top plate retracts, it cannot pull the first fluid upwards. In this way a lowered ceiling effect can be prevented and a reduction of the tsunami effect is obtained.

Movement of the second support plate is understood to mean movement of a portion of this plate, i.e. local bending of the plate, as well as movement of the entire plate.

A first subclass of the first class is further characterised in that the component is constituted by an array of protruding elements having a hydrophilic surface and having their base on the second support plate and a height smaller than the distance between the first support plate and the second support plate. The hydrophilic surface reduces the chance that the first fluid moves along a protruding element and touches the first fluid from another pixel, which may cause transfer of first fluid from one pixel to another pixel.

Usually the term hydrophilic surface is used to indicate that a surface attracts water, which may be the second fluid in the electrowetting display. However since the second fluid may be other than water and the surface should be wettable to this other fluid and since also several degrees of wettability are possible, in this description and claims hydrophilic is understood to mean more wettable to the second fluid than to the first fluid. Similarly the term hydrophobic is understood to mean less wettable to the second fluid than to the first fluid.

To obtain a hydrophilic surface either a hydrophilic material may be chosen for the, possibly protruding, elements or these elements may be coated with a hydrophilic layer. For such a hydrophilic layer or material, many choices are available. Some examples are glass, SiO2, SiN. Also porous or rough hydrophilic surfaces, such as hydro-gel coatings can be used to create a surface that is more wettable to the second fluid.

The array of protruding elements may be arranged in a regular pattern or in an irregular pattern. An irregular pattern has the advantage that the elements are less visible. A regular pattern is more visible than an irregular pattern because of effects such as Moiré between the pattern of the protruding elements and the pattern of the pixels.

The embodiments of the first subclass are preferably further characterised in that the hydrophilic elements narrow towards the first support plate. This provides the advantage that the second fluid is better contained within the spaces between the protruding elements, i.e. the hydrophilic effect is enlarged. Moreover, the optical effect of these elements, i.e. their visibility in the displayed image is reduced.

A further reduction of the visibility is obtained in embodiments, which are characterised in that the material of the protruding elements is transparent. Preferably the refractive index of the protruding elements is substantially equal to that of the second fluid. In this way the protruding elements are not discernible and consequently they are not visible in the displayed image.

The bases of the protruding elements may be spaced from each other or arranged close to each other or against each other. In the latter case their envisaged effect of enclosing the second fluid so that the first fluid cannot adhere to the second support plate is enlarged.

A first embodiment of the first subclass is characterised in that the protruding elements have a square base.

The protruding elements may, for example have a prismatic shape, which helps to contain the second fluid, e.g. water, between the protruding elements so that the first fluid, e.g. oil, cannot touch the second support plate.

A second embodiment of the first subclass is characterised in that the spacer elements have a circular base.

A third embodiment of the first subclass is characterised in that the spacer elements form a raster pattern, similar to the pixel pattern that is formed on the first support plate. In this case, the spacer elements on the second support plate as well as the surface in between the spacer elements are made of a hydrophilic material.

The protruding elements of the first, second and third embodiments may be arranged in a two-dimensional regular, e.g. matrix pattern or in an irregular pattern. The elements may be arranged close to each other so that for each display-element one or more protruding elements is (are) present. The protruding elements may also be arranged at larger mutual distance, for example one element for a number of electrowetting elements. In the latter case the elements are less visible.

A fourth embodiment of the first subclass is characterised in that the protruding elements are longitudinal ridges which longitudinal dimension is substantially equal to the corresponding dimension of the surface of the first support plate.

The ridges have a similar effect as for example a matrix of prismatic shaped protruding elements. The length direction of the ridges may be either at an angle or parallel to an element wall. In this embodiment only alignment in one direction is required. Moreover, in case the protruding elements would touch the element walls the latter can better withstand the pressure of the elements if these are longitudinal.

A second subclass of the first class is characterised in that the preventer is constituted by a layer at the inner side of the second support plate, which layer is hydrophilic during use of the display. The hydrophilic surface reduces the chance that the first fluid moves along the inner side of the second support plate and touches the first fluid from another pixel, which may cause transfer of first fluid from one pixel to another pixel.

The layer may be permanently hydrophilic, i.e. made of a hydrophilic material, for example silicon oxide or silicon nitride or a metal. Also porous or rough hydrophilic surfaces, such as hydro-gel coatings can be used. It is also possible to provide the inner side of the second support plate with a layer of another material and to apply a voltage between the second fluid and an electrode on the second support plate so that this layer becomes effectively hydrophilic during use of the display. This other material may even be hydrophobic, such as an amorphous fluoropolymer, for example AF1600 or another low surface energy polymer such as parylene. Again the first fluid is prevented from attaching to the second support plate and this fluid is pushed down when the second support plate moves downwards so that a lowered ceiling effect is prevented.

A third subclass of the first class is characterised in that the second support plate is provided with movement limiting elements preferably at locations corresponding to the element walls on the first support plate, which elements extend in a direction perpendicular to the support plates and have a length smaller than the distance between the support plates and larger than the maximum height of the first fluid in a element, when in the transmitting state.

The movement limiting elements, which warrant a distance between the support plates larger than a critical distance to be maintained, are suitable for preventing a lowered ceiling effect in a display device wherein the distance between the support plates is relatively small. For example this distance is somewhat larger than the height of the first fluid in an electrowetting element when in a state of maximum transmission. The movement limiting elements also limit movement of the second fluid and thus prevent this fluid from leaving the second support plate.

A fourth subclass of the first class is characterised in that the second support plate is provided with distance defining elements at locations corresponding to the element walls, which elements extend in a direction perpendicular to the support plates and touch the element walls on the first support plate.

Since the distance defining elements have a length equal to the initial distance between the support plates, they prevent motion of the second support plate toward the first support plate so that the first fluid cannot escape from an electrowetting element. In this way both a lowered ceiling effect and a tsunami effect is no longer possible. The distance defining elements should have a relative small cross section to prevent these elements from having an optical effect. Also the small cross section makes sure that the distance defining elements do not interfere with the motion of the first fluid when switching the electrowetting elements. In addition, the small cross section facilitates alignment of the distance defining elements with the underlying electrowetting element walls, during assembly of the display. In some display devices it may be sufficient to use a single distance defining element for a group of electrowetting elements.

The requirement to have a small cross-section has not to be met in a second embodiment of the fourth subclass that is characterised in that the second support plate is provided with a number of lenses corresponding to the number and location of the distance defining elements. Each of the lenses makes the corresponding distance defining elements invisible so that the elements may have a larger cross-section and are more robust.

An embodiment of the second class is characterised in that the first support plate is provided with first distance defining elements and the second support plate is provided with second distance defining elements, the total length of a first and a second element being equal to the distance between the first and second support plate.

An embodiment of the third class is characterised in that the space between the support plates includes free bodies of a preferably transparent material having a dimension in the direction perpendicular to the support plates larger than the maximum height of the first fluid in an element when in the transmitting state.

A free body is understood to mean a body that is not fixed to any of the components of the electrowetting elements and in principle can move in the space between the supporting plates. This space is understood to mean the common space of the electrowetting elements. This embodiment is preferred because it is does not require any additional steps in the manufacturing process and no further alignment of the first and second support plate is required.

A further embodiment of the third class is further characterised in that the free bodies are spheres. Spheres have the advantage that their dimensions do not change upon rotation. Since the ratio of width versus height is 1 for a sphere and this ratio is larger than one for most other shapes, spheres will have the smallest possible size in the direction parallel to the support plates and, as such, cause the smallest possible lateral disruption.

A further embodiment of the third class is further characterised in that the free bodies are rods, as these will reduce the force on the first support plates when the lowered ceiling effect takes places, since the force applied will be spread over a larger surface. As such damage to the first support plate and the hydrophobic insulator can be avoided.

A further embodiment of the third class is further characterised in that the free bodies that are rods have a longest dimension that is larger than the diagonal dimension of the electrowetting elements. In this case, the free bodies will be in contact with electrowetting element walls having a height when the lowered ceiling effect takes place and no contact will take place with the electrowetting element area that is covered by the first fluid in the state when there is no voltage applied.

All of the embodiments of the third class are preferably further characterised in that the free bodies have a refractive index substantially equal to that of the second fluid.

An embodiment of the fourth class is characterised in that distance-defining elements are arranged between the supporting plates at positions outside the electrowetting elements. The distance defining element may also be used to provide a decorative or design effect within the display device.

A second embodiment of the fourth class is characterized in that the distance defining elements are arranged between the support plates at positions within the electrowetting elements. Preferably, the edges of the defining elements are positioned on the element walls, as this reduces the optical interference due to the presence of the distance defining elements.

A fifth class is characterised in that there is a mechanism that switches the display off when the second support plate is bent to an extent that brings the inner surface of the support plate close to the first fluid when in the contracted state. Such a preventing mechanism can for instance be an electrical or optical feedback loop or a capacitance measurement between first and second support plate. When the display is switched off, the first fluid switches back to the off-state which has the thinnest possible layer thickness. The preventive mechanism of the fifth class can be combined with one of the embodiments described in the other classes.

A sixth class of embodiments pertains to a further aspect of the invention and relates to a display device comprising picture elements, which are constituted by electrowetting elements having at least one first fluid and a second fluid immiscible with each other within a space between a first support plate and a second support plate, the second fluid being electro-conductive or polar, whereby the first fluid in each picture element is at the side of the first support plate confined by element walls, and the second fluid is shared by a plurality of picture elements, characterised by spacer elements arranged at the inner side of the second support plate, the spacer elements having a height smaller than the distance between the second support plates and being arranged in an irregular pattern.

The irregularity or randomness of the pattern reduces the visibility of the spacer elements when viewing the display device. The irregularity also reduces the cost of the display, because during manufacture the spacer elements on the second support plate need not be aligned with element walls on the first support plate.

A pattern is irregular or random if preferably the spread in nearest neighbour distance is larger than a minimum size of the spacer element in the plane of the second support plate, or, when the spacer elements have a direction in the plane of the second support plate, the spread in directions is larger than 10 degrees. In a specific embodiment the nearest neighbour distance is between 4 and 12 times the length of a side of a pixel and the size of the spacer element is between one tenth and one time said length; i.e. the spread is at least 8 times the minimum size of the spacer element.

In a preferred embodiment of the sixth class the height of the spacer elements is smaller than the distance between the second support plate and the first fluid in a contracted state. The distance is measured without an external force moving the support plates together. The first fluid can be switched between the non-contracted and the contracted state without being affected by the presence of a spacer element.

The height of the spacer element is preferably larger than the height of the first fluid in the contracted state minus the height of the element walls. When the support plates are being pushed together until spacer elements touch the element walls, the spacer elements are still sufficiently high that the first fluid will not touch the second support plate in the contracted state. Hence, there is less risk of the first fluid attaching to the second support plate.

A further aspect of the invention relates to a method of making a support plate for an electrowetting display device, including the steps of: depositing curable material on the support plate; and curing the material to form spacers attached to the support plate. The method allows a simple manufacture of both a regular and in particular an irregular pattern of spacer elements. The curable material may be the material of which the spacers are made and/or it may be used for adhering spacers to the support plate.

Further features and advantages of the invention will become apparent from the following description of preferred embodiments of the invention, given by way of example only, which is made with reference to the accompanying drawings.

DETAILED DESCRIPTION OF THE INVENTION

Figure 1:
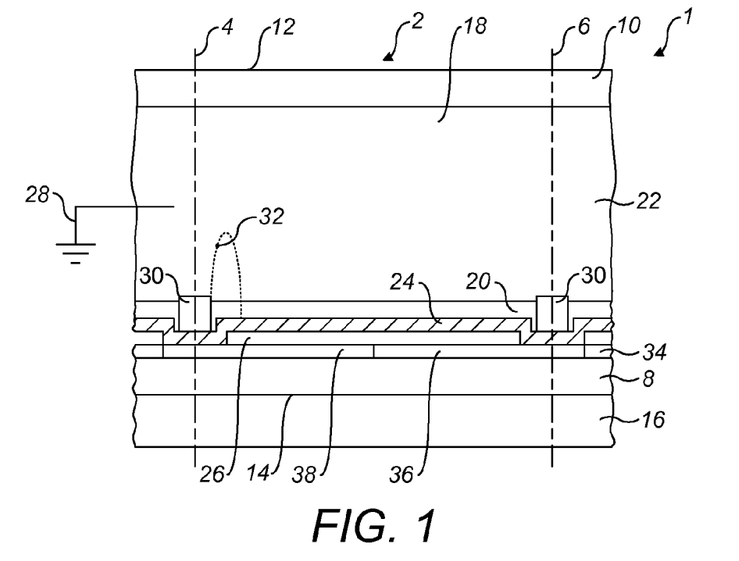
FIG. 1 shows a diagrammatic cross-section of a part of an electrowetting display device wherein the invention can be used.

To illustrate the background of the invention the principle of an electrowetting display device will be described. FIG. 1 shows a diagrammatic cross-section of a part of an embodiment of such a device that has been described earlier. The display device 1 includes a plurality of electrowetting elements 2, only one of which is shown in the Figure. The lateral extent of this element is indicated in the Figure by two dashed lines 4, 6. The electrowetting elements comprise a first support plate 8 and a second support plate 10. The support plates may be separate parts of each electrowetting element, but the support plates are preferably in common for the plurality of electrowetting elements. The support plates may be made for instance of glass or polymer and may be rigid or flexible.

The display device has a viewing, or front-, side 12 on which an image formed by the display device can be seen and a rear, or back-, side 14. In some displays the viewing can also be done from side 14. In this example, the first support plate 8 faces the rear side and the second support plate faces the viewing side. The image is formed by light passing through each electrowetting element from the rear side 14 to the viewing side 12, where it is transmitted through the second support plate 10. The image is built up of picture elements, or pixels. Each picture element may contain a single electrowetting element 2. Alternatively, each picture element may contain a plurality of electrowetting elements 2, each electrowetting element forming a sub-picture element. Such a composed picture element may for example be one or more segments in a direct-drive, segmented display or may include three sub-picture elements provided with colour filters for red, green, and blue, thereby forming an RGB picture element.

An illumination unit 16 may be attached to the rear side 14 of the plurality of electrowetting elements to provide backlighting of these elements. The illumination unit 16 may comprise a single white light source. Alternatively, it may comprise a plurality of colour light sources for spectrum sequential operation of the display. The colours of the light sources may, for example be yellow, blue and green. The light sources may be conventional light sources, such as fluorescent lamps or light emitting diodes, or LED's. The illumination unit may be of a conventional construction, such as disclosed for instance in international patent application WO 2006/011101, which describes a uniform backlighting unit for a liquid crystal display device.

A space 18 between the support plates 8, 10 is filled with two fluids: a first fluid 20 and a second fluid 22. These fluids are immiscible with each other. The second fluid is electrically conductive or polar and may be a water or salt solution such as a solution of KCl in a mixture of water and ethyl alcohol. The second fluid is preferably transparent. The first fluid 20 is electrically non-conductive and may for instance be an alcane like hexadecane or (silicone) oil. A hydrophobic layer 24 is arranged on support plate 8, facing the space 18. This layer may be an uninterrupted layer extending over a plurality of electrowetting elements or it may cover only the cross-section of one electrowetting element. The layer may be for instance an amorphous fluoropolymer layer such as AF1600 or a layer of other low surface energy polymers such as Parylene. The hydrophobic character causes the first fluid to adhere preferentially to the first support plate 8.

Each electrowetting element includes an electrode 26 arranged on the first support plate 8. The electrode is separated from the fluids by an insulator, which may be said hydrophobic layer 24. In general the electrode has the same shape as the cross-section of the electrowetting element. A second electrode 28 is connected to the conductive second fluid 22. This electrode can be common to a series of electrowetting elements, uninterrupted by walls. The electrodes on the support plate 8 are connected to an electrical terminal on the support plate by a matrix of printed wiring. The electrodes 26 and wiring are preferably transparent and made of e.g. indium tin oxide (ITO). The matrix may include switching elements such as transistors; in this case the matrix is called an active matrix.

The lateral extent of the first fluid 20 is constrained to one electrowetting element by walls 30 that follow the cross-section of the electrowetting element. Further details of the electrowetting element and its manufacture are disclosed amongst others in international patent application WO 2005/098797.

The first fluid absorbs at least a part of the optical spectrum. This fluid may be transmissive for a part of the optical spectrum, thus forming a colour filter. For this purpose the fluid may be coloured by addition of pigment particles or dye. Alternatively, the fluid may be black, i.e. absorb substantially all parts of the optical spectrum.

When a nonzero voltage is applied between the electrodes 26 and 28, electrostatic forces will move the second fluid towards the electrode 26, thereby repelling the first fluid 20 from the area of the electrode 26 to the walls 30 surrounding the area of the electrode, which is schematically indicated by a dashed line 32. This action removes the first fluid from the optical path that runs from the rear side 14 to the viewing side 12 through the electrowetting element. When the voltage is returned to zero, the first fluid flows back to cover the hydrophobic layer 24. In this way the first fluid 20 forms an electrically controllable light switch.

To make optimum use of the available light for image formation the display may be designed as a transflective display. In that case a structured reflector 34 is arranged on support plate 8. The structured reflector comprises transparent areas and reflective areas. The embodiment of FIG. 1 comprises one transparent area 36 and one reflective area 38 within the cross-section of the electrowetting element 2. When the first fluid 20 is in the repelled state as indicated by numeral 32, light from the illumination unit 16 will be transmitted to the viewing side 12 of the display device and ambient light from the viewing side will be reflected from the reflective area 38 and returned to the viewing side. When the first fluid 20 covers the hydrophobic layer 24, both the light from the illumination unit and from the ambient environment will be absorbed in the first fluid. An image formed by the plurality of electrowetting elements will be visible in any ambient light level, from bright sunlight to darkness.

The ratio of the transparent area 36 to the reflective area 38 can be chosen in dependence on the use of the display device. A display device for indoor use can be designed to make optimum use of the relatively small amount of light available from the illumination unit 16. The efficiency of the use of light is increased when the ratio is larger than 1, for instance 4. A display device for outdoor use can be designed to make optimum use of the ambient light and use the illumination unit only for providing some light under low ambient light conditions. In such a case the ratio is preferably smaller than 1, for instance 0.1.

In the above description of the electrowetting element the first fluid 20 either covers the area of the electrode 26 or is removed from it. International patent application WO 2003/071346 discloses measures to allow the first fluid to cover the area of the electrode 26 partly, thereby realising so-called grey values. The grey values may be obtained by applying an analog voltage to the electrowetting element that positions the first fluid to cover the area of the electrode only partially. Grey values may also be obtained by applying a pulse-width-modulated voltage to the electrowetting element.

According to the invention the display device is provided with a preventer for preventing electrowetting elements from being destroyed when pressure is exerted on the second support plate 10, hereinafter the top plate. The range of pressures may extent from a short small pressure, for example a finger touch on a touch panel, to a long and large pressure, which may occur during assembly of the entire display or during transportation.

Figure 2:
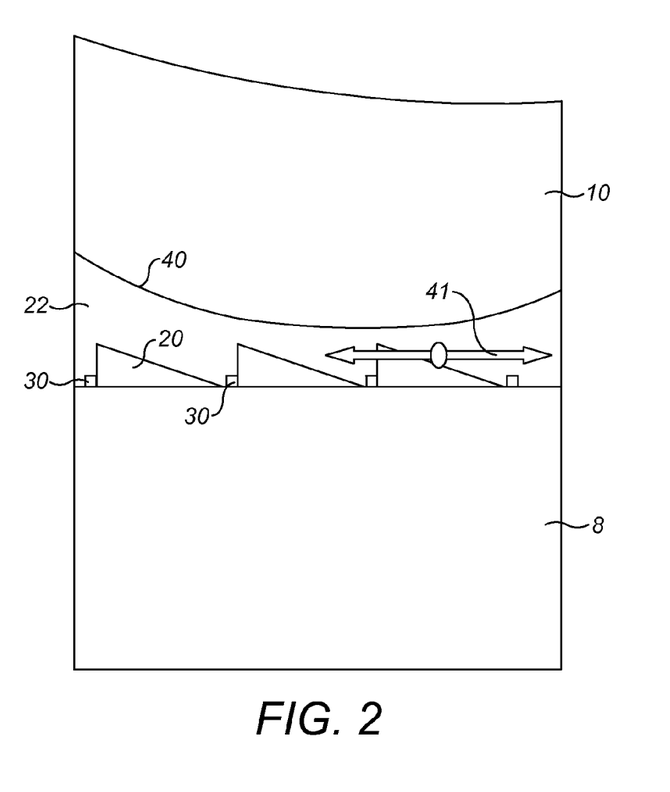
FIG. 2 illustrates a first effect of pushing down a support plate.

A pressure pulse exerted on the top plate may create a shock wave, which propagates through the fluids and may even be magnified and which causes first fluid portions to flow over element walls. This effect, which may be called the tsunami effect, is illustrated in FIG. 2. This Figure shows a cross-section of a small portion, i.e. three elements, of an electrowetting display having a first support plate, or base plate 8, and a second support plate, or top plate, 10 and element walls 30. For ease of drawing, the shapes of displaced first fluid portions 20 in FIG. 2 and contracted first fluid portions in FIG. 3 and subsequent figures are approximated by triangular and square shapes, respectively. In reality, these fluid portions will be rounded.

A sudden bent of the surface 40, caused by a pressure pulse on top plate 10 creates shock waves in the second fluid, e.g. water. These shock waves, indicated by double arrow 41, sweep up the oil so that portion of it may overflow the element walls towards neighbouring electrowetting elements. FIG. 2 shows the effect of a shock wave moving to the left on the first fluid 20.

Figure 3:
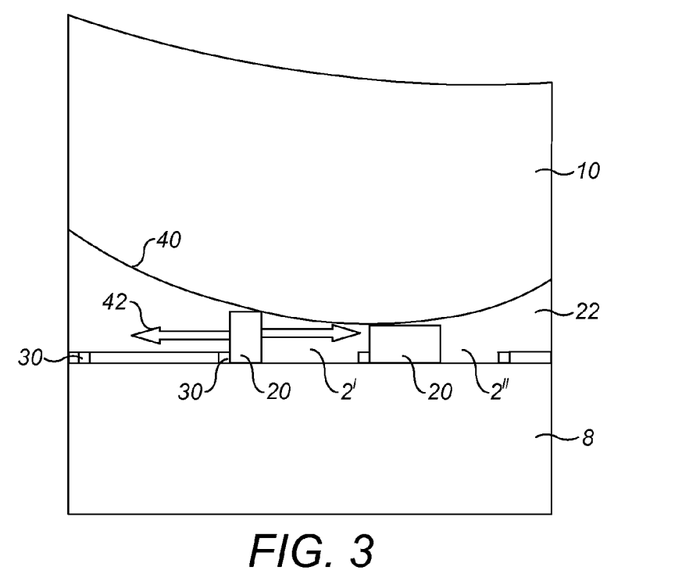
FIG. 3 illustrates a second effect of pushing down a support plate.

Another effect is that the area of the top plate on which pressure is exerted will move downwards. As a result the top plate will push the second fluid down and this fluid will expel a portion of the first fluid from the element. If the distance between the support plates, i.e. the gap width becomes small enough, the expelled fluid will even adhere to the top plate. This effect, which may be called the lowered ceiling effect, is illustrated in FIG. 3. This Figure shows the same portion of the electrowetting display as FIG. 2. One of the elements, element 2' is in fully open, i.e. transmitting state so that the oil 20 is pushed to one side and has a maximum height. When sufficient downwards force is exerted on top plate 10, its lower surface 40 will bend and push aside a portion of the oil in element 2', out of this element as indicated by double arrow 42. The expelled oil portion can migrate to neighbouring elements. Moreover, since oil of element 2' is in contact with surface 40 or very close to it, the oil can adhere to this surface and remain there when the surface retracts, i.e. when the force ceases. This may also happen with oil of element 2", which is in the half open state and which oil also touches the surface 40.

Both the tsunami and the lowered ceiling effect are permanent and detrimental for the performance of the electrowetting display because the performance is critically dependent on the amount of first fluid, e.g. oil, in the elements. In particular for control of grey levels of the elements the oil dose is very critical. Already if an amount of less than 20%, for example 10% of the oil is removed from an electrowetting element, this element, and its neighbour element that receives the expelled oil will no longer perform the required optical switching so that the optical transfer function is impaired. If a larger amount of oil is expelled from an electrowetting element this element will be "lost" for the display. As is known in the art, the human eye is very critical and will notice even a single missing pixel in a display. In practice more than one pixel will get lost when pressure is exerted on the display. The number of missing pixels is determined by the type of pressure. In case of local pressure, for example by a finger or a pen like element on a touch screen, a limited number of pixels will get lost. If a larger area of the display is pressed, a substantially larger number of electrowetting elements may be destroyed.

Not only during use, but also during manufacture of an electrowetting display after the array of elements has been finished, elements may be destroyed during proceeding process steps, such as filling, sealing, scribing, breaking, addition of layers for the assembly process or layers to improve the optical performance. Moreover, the addition of reflector means and front- or back-light means may also be attended with element destruction. Finally, during transport of the display elements may also be destroyed due to mechanical shocks or other forces, which temporarily cause a change of the gap width. By providing an electrowetting display with one or more preventers according to the invention the oil, or another first fluid, will be retained in the elements and the display becomes pressure resistant.

In the electrowetting display of the invention several types of preventers can be used. In embodiments of a first class the preventers are provided on the lower surface of the second support plate. These preventers comprise an array of elements having their base on the said surface and protruding therefrom in the gap between the support plates. The length of a protruding element, i.e. the dimension in the direction perpendicular to the second support plate, is smaller than the gap width. The protruding elements are preferably hydrophilic, or more general more wettable, to water or another second fluid and thus are oil repelling. Preferably the protruding elements narrow in the direction towards the first support plate, e.g. are cone shaped. This provides the advantage that they occupy less space in the gap and thus are less visible, whilst they cover sufficient areas of the surface 40. Preferably the index of refraction of the protruding elements is equal or approximately equal to the index of refraction of the second fluid, e.g. water so that these elements are not visible in the image to be displayed. The base of the protruding elements may have any shape, for example square or circular.

Figure 4A:
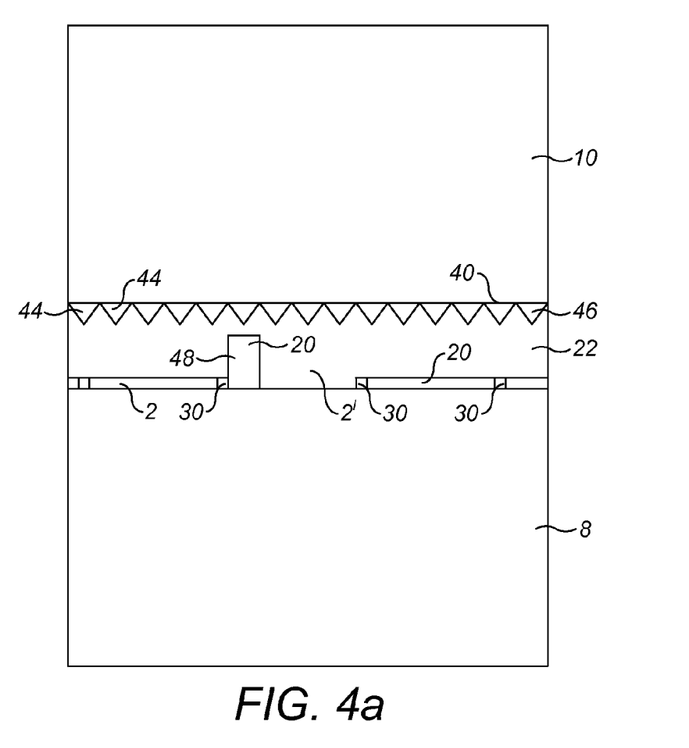
FIGS. 4a and 4b show a first embodiment of protruding preventers.
Figure 4B:
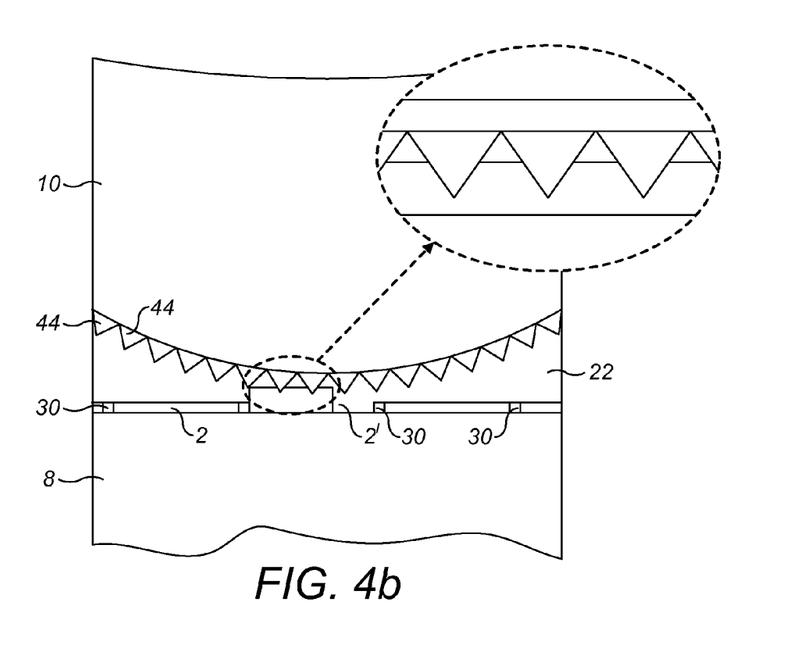

A preferred embodiment of the electrowetting display with protruding elements is shown in FIGS. 4a and 4b. FIG. 4a shows the design of the protruding elements and FIG. 4b shows the effect of the configuration when bending of the second support plate occurs.

FIG. 4a shows a cross-section of again a three-element portion of the electrowetting display. The lower surface 40 is provided with an array of prism shaped protruding elements 44. In this case, the length of the protruding elements is chosen to be considerably smaller than the gap width. The protruding elements can also be higher than the first fluid in the contracted state, while not bridging the total gap width.

The prismatic elements 44 are preferably hydrophilic to water and thus prevent that oil, or a similar first fluid, will adhere to them. The elements 44 may be made of a hydrophilic material such as glass or the may be covered with a hydrophilic layer, such as $SiO_2$ or $SiN$. Also porous or rough hydrophilic surfaces, such as hydro-gel coatings can be used to create a surface that is more wettable to the second fluid.

Moreover, the structure 46 itself of micro prisms 44 contributes to enclosing water 22 as indicated in the inset of FIG. 4b. This structure can be manufactured by well-known replica processes. When the top plate 10 is locally pushed down its lower surface 40 with the prismatic structure will be bent locally downwards whereby water will be retained in this structure. This will also be the case at the location of the transmitting element 2' where the oil 20 is pushed into a column 48. The bent prism structure at this location will push down column 48 so that the oil cannot overflow the element wall. Moreover, and probably more important, the oil cannot adhere to the lower surface of the top plate. When pushing of the top plate ceases this plate will re-take its original shape and the oil in the elements will re-take the original shape and position. In this way the electrowetting display is made pressure resistant.

Figure 5:
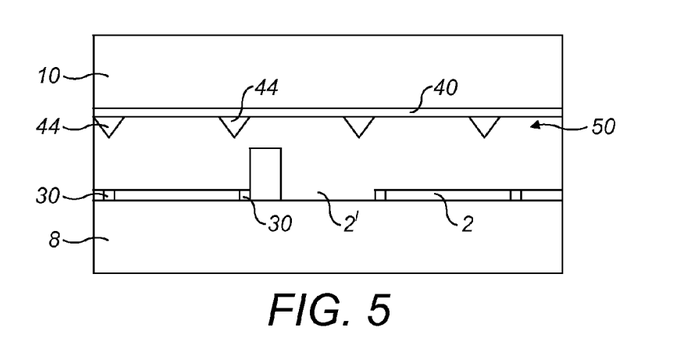
FIG. 5 shows a second embodiment of protruding preventers.

Although it is preferred to have the micro prisms 44 arranged against each other so that their bases cover the entire surface, as shown in FIG. 4a, this is not necessary. The prisms may also be remote from each other so that for instance there is one prism per electrowetting element or even one prism for a number of elements, provided that sufficient hydrophilic character is obtained. The lower the number of protruding elements the lower their visibility will be. FIG. 5 shows a cross-section of a micro prism structure 50 comprising approximately one prism 44 per element 2. In view of the foregoing this Figure needs no further explanation.

Figure 6:
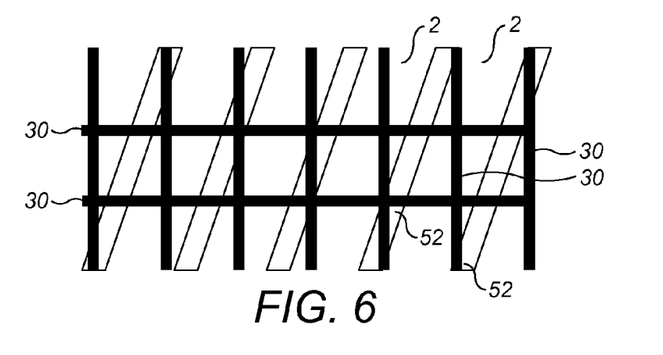
FIG. 6 shows a third embodiment of protruding preventers.

FIG. 6 shows a top view of another embodiment of a structure of protruding elements. The elements 52 are now ridges having their length direction either at an angle to the element walls 30, as shown in FIG. 6 or parallel to an element wall. The length dimension of the ridges is substantially equal to the corresponding dimension of the surface 40. In a plane perpendicular to the plane of FIG. 6, i.e. in cross section view like FIG. 4a, the ridges may have several shapes, but preferably they narrow towards the first support plate and more preferably they have a prismatic shape such as shown in FIG. 4a. The ridges have a similar effect as for example a matrix of prismatic shaped protruding elements. In this embodiment only alignment in one direction is required. Moreover, in case the protruding elements would touch the element walls the latter can better withstand the pressure of the elements if these are longitudinal. This prevents also that the hydrophobic layer get damaged by a large force.

Figure 7A:
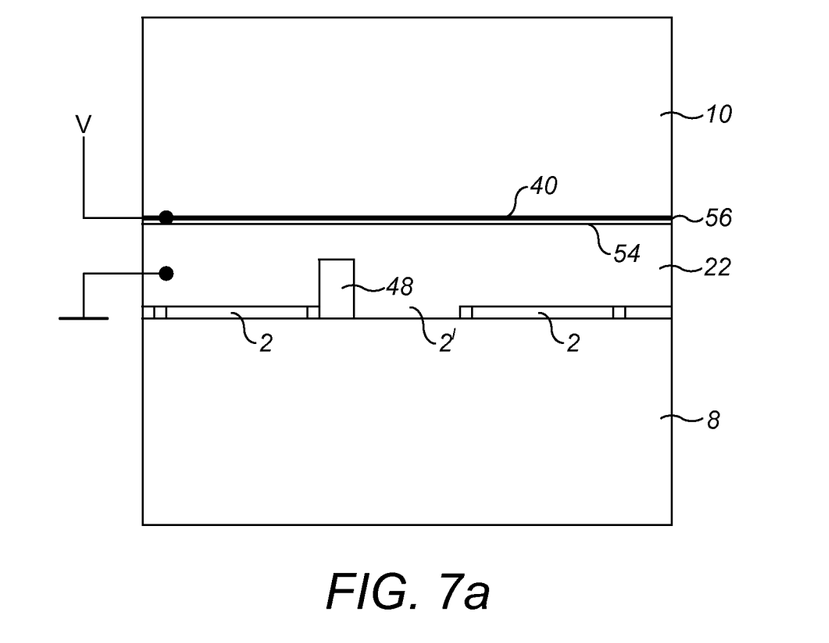
FIGS. 7a and 7b show an embodiment wherein the preventer is a hydrophilic surface.

FIG. 7a shows another embodiment of a preventer at the lower surface of the top plate 10. This Figure again shows a cross-section of a three-element portion of the electrowetting display wherein element 2' is in the transmitting state. The preventer is constituted by a layer 54, which is hydrophilic during use of the display.

The layer may be permanently hydrophilic, i.e. made of a hydrophilic material, for example silicon oxide or silicon nitride or a metal. Also porous or rough hydrophilic surfaces, such as hydro-gel coatings can be used to create a surface that is more wettable to the second fluid.

As is shown in FIG. 7a, it is also possible to provide the lower surface 40 of the top plate with a layer 54 of another material and to apply a voltage V between the second fluid 22 and an electrode 56, interposed between the surface 40 and the layer 54. The voltage V causes layer 54 to become hydrophilic during use of the display. The material of layer 54 may even be hydrophobic, such as an amorphous fluoropolymer, for example AF 1600 or another low surface energy polymer such as parylene. Voltage V may be another voltage than the voltage applied between electrode 26 on the first support plate (FIG. 1) and the water or the same voltage. In the latter case one voltage source can be used for two purposes.

Figure 7B:
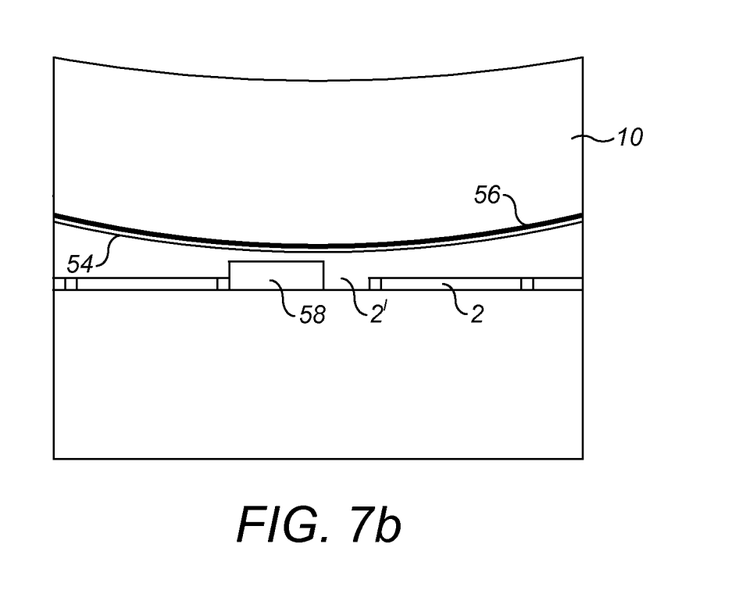

As is illustrated in FIG. 7b, when the top plate 10 is pushed down and thus its lower surface 40 bent towards the first support plate 8 water 22 will remain adhered to this surface and, in case a layer 54 is present to this layer. The downwards moving water will push the oil 20 into the elements 2; especially the height of oil column 48 in the transmitting element 2' (FIG. 7a) will be substantially reduced, so that the oil mass 58 will occupy a larger area of the element 2'. Also in this way it is prevented that oil overflows the element walls and adheres to the top plate so a lowered ceiling effect is prevented.

The preventing elements at the lower surface of the top plate may also be constituted by movement limiting elements, which warrant that the gap width will always be equal to or larger than a minimum gap width. The minimum gap width is for instance of the order of five times the thickness of the oil in an element that is in the off state or of the order of the height of the oil in an element that is in the maximum on state. The movement limiting elements are suitable for preventing a lowered ceiling effect in a display device wherein the distance between the support plates is relatively small. By a proper distribution of these elements across the second support plate and proper alignment of the support plates the movement limiting elements are facing the electrowetting element walls. The size of the element walls can be enlarged so that they can better withstand the pressure exerted by the movement limiting elements when these will contact the element walls.

Figure 8A:
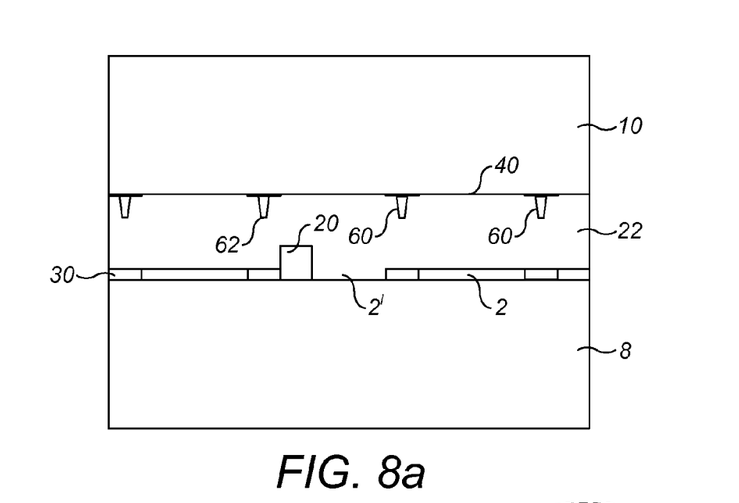
FIGS. 8a, 8b and 8c show an embodiment wherein the preventers are movement limiting elements.
Figure 8B:
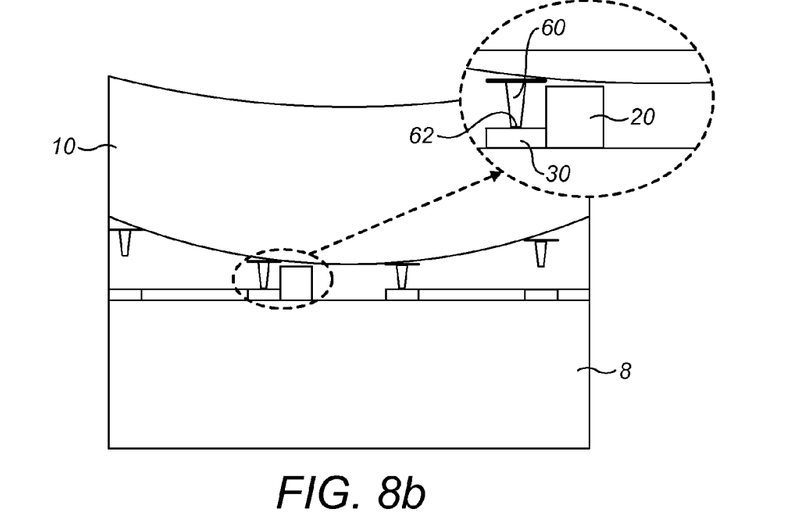

FIG. 8a shows an embodiment of an electrowetting display that is provided with movement limiting elements 60. These elements are fixed preferably on support plate 10 but can also be on support plate 8 or on both. The embodiment shown in FIGS. 8a and 8b comprises a combination of movement limiting elements 60 positioned on a black matrix material, indicated by the black lines. A further embodiment would be an electrowetting display with the movement limiting elements 60 without the black matrix material. The display portion shown in FIG. 8a is similar to that shown in FIGS. 4-7. Preferably the movement limiting elements 60 narrow to a point-like top ends 62. The point-like top has several advantages, including the reduction of contact area, easier alignment and a reduced risk of interference with the oil motion. As is shown in FIG. 8b, especially in the enlarged portion at left top, upon bending down of the top plate 10, one or more element(s) will bump against a element wall 30 and at that position the downwards movement of the lower surface 40 of the top plate will be stopped. The distance between the top plate and the base plate at that position is larger than the height of the maximum contracted oil 20 in the maximum transmitting element 2'. Thus the oil does not come into contact with the top plate so that a lowered ceiling effect does not occur. To show the effect clearly, the aspect-ratio in the figure is not to scale. In practice, the movement limiting elements and the black matrix material will follow the shape of the bent second support plate.

Figure 8C:
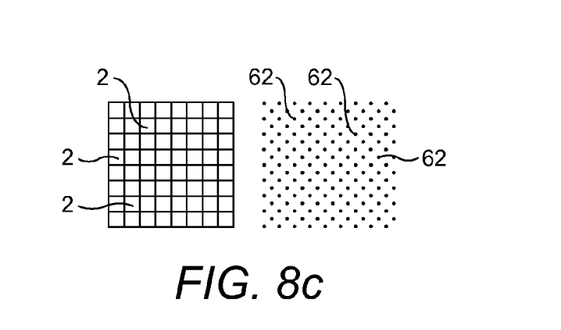

FIG. 8c further illustrates this embodiment. At the left side a top view of a portion (8×8 elements) of the display is shown and at the right side the positions of the top ends 62 of the movement limiting elements relative to the elements is shown.

The density of the movement limiting elements, i.e. the number of elements per area unit may be adapted to the design of the electrowetting display. In some displays one can use fewer limiting elements than electrowetting elements. For example, one limiting element per three electrowetting elements can be used. In a colour display wherein the different colours are generated by stacked sub-displays each having a first and second support plate, or in a black and white display a shared movement limiting element may be provided for each wall of all elements. In a colour display wherein each pixel is divided in a number of sub-pixels corresponding to the number of colours to be displayed, i.e. each electrowetting element is divided in a number of sub-elements, a shared movement limiting element may be provided for each wall of all sub-elements.

Figure 9A:
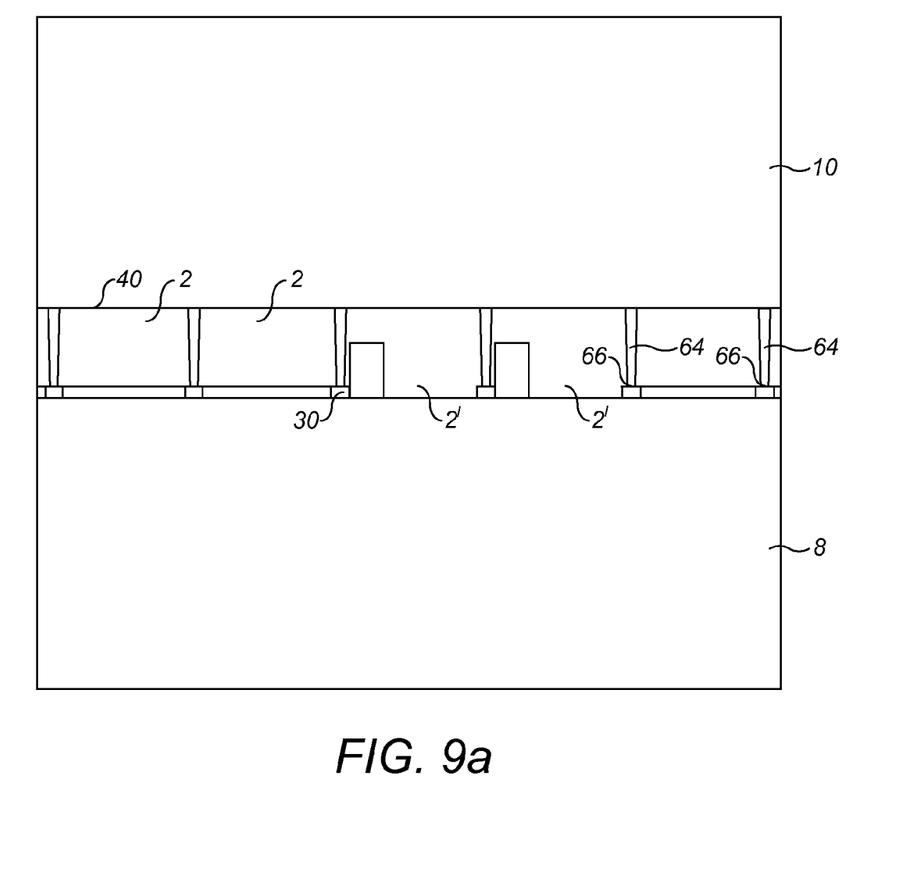
FIGS. 9a and 9b show an embodiment wherein the preventers are distance-defining elements.

The preventers at the lower side of the top plate may also be constituted by distance, or gap width, defining elements as shown in FIG. 9a. This Figure shows a cross-section of a five-element portion of the electrowetting display. The distance defining elements 64 are narrow pillars, which preferentially are tapered to tops 66. These elements prevent the top plate from bending downwards even when a downward force is exerted on the upper side of the plate. Thus elements 64 warrant a constant gap width, which is equal to the length of the pillars, to be maintained. In this way movement of oil due to forces other than electrowetting forces is prevented.

Figure 9B:
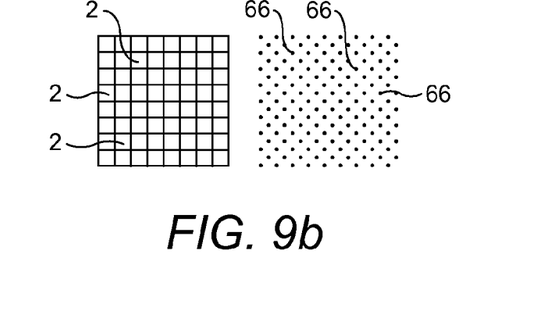

Similar to FIG. 8c, FIG. 9b shows a top view of a portion of this embodiment of the display and the positions of the top ends 66 of the distance defining elements.

The density of the distance defining elements 64 may be similar to the density described herein above for the movement limiting elements 60 of FIG. 8a.

Figure 10:
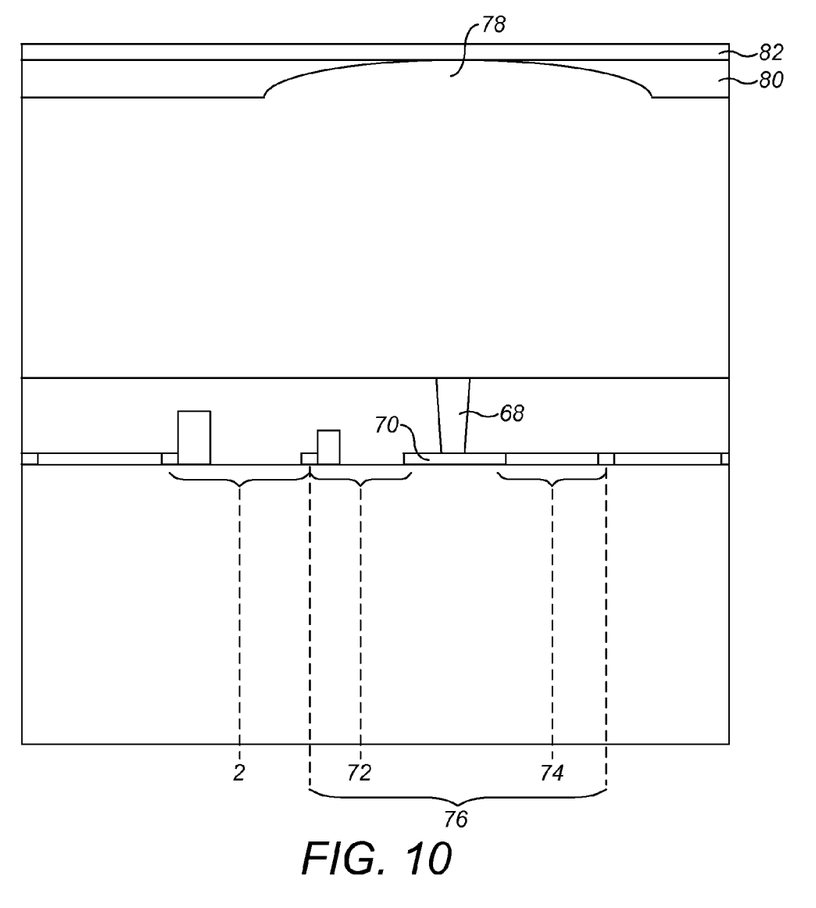
FIG. 10 shows an embodiment having pairs of a distance-defining element and a lens.

FIG. 10 shows a cross-section of an embodiment of the electrowetting display that is provided with a more robust preventer. This preventer comprises distance defining pillars, or columns 68, which are substantially wider than the pillars of FIG. 9a. Moreover, the pillars rest on walls 70, which are substantially broader than normal element walls 2. It will be clear that the pillars 68 have the same function as pillars 64 in FIG. 9a, but in combination with the enlarged walls the display can withstand a larger pressure. In addition, alignment of the pillars 68 on the enlarged electrowetting element walls is easier in this embodiment. Also in this case, the pillars 68 may be tapered. These pillars might be small enough so that they are hardly visible.

According to a further aspect of the invention the relatively broad pillars are made substantially invisible in the image to be displayed. This is realised by means of an array of lenses corresponding to the array of pillars. FIG. 10 shows one lens 78 of the array, which lens is aligned with the pillar 68. Moreover the electrowetting element facing this pillar is divided into two sub-elements: a first sub-element 72 at the left side and second sub-element at the right side of the enlarged wall 70. The sub-elements 72 and 74 together with the wall 70 form sustaining pixel 76, that is larger than a normal pixel 2. The optical design of the light path formed by a sustaining pixel 76 and the corresponding lens is such that the left pixel is visible to only the right eye of a viewer, while the right pixel is visible to only the left eye of the viewer. To improve the optical quality of this embodiment a diffuser structure 82 may be added to the display to make the light from a sustaining element more uniform at the viewer side. The number of pillars 68, enlarged electrowetting element walls and lenses 78 can be different for different display devices. With video processing they can be made even less visible by adapting the gray level of the surrounding elements to compensate for the optical difference caused by the elements.

As is shown in FIG. 10 the lens may be constituted by a cavity in a transparent layer 80 of for example plastics of optical quality. The lens may also be a planar, or diffraction lens, such as a Fresnel lens. The lens layer 80 and the diffuser layer 82 may be integrated into one thin layer or film. Instead of at the viewing side of second support plate 10, as shown in FIG. 10, the layers 80 and 82 may also be arranged at the lower side of this plate.

The measures shown in FIG. 10 can also be used in other embodiments where protrusions from the second support plate may contact element walls, such as the embodiment of FIG. 8*a*.

Figure 11:
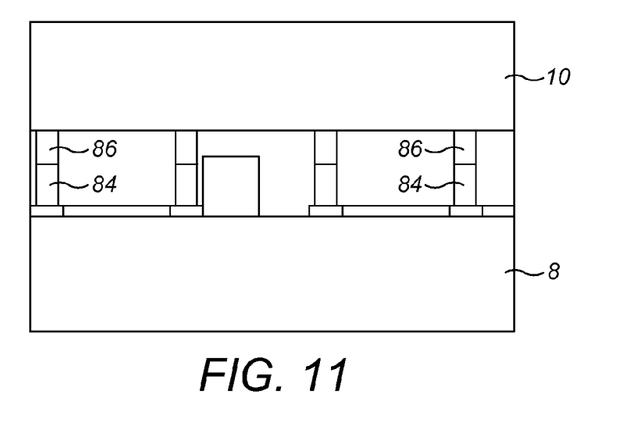
FIG. 11 shows an embodiment wherein both the first and second support plate are provided with distance-defining elements.

It is not necessary that the pillars of FIGS. 9*a* and 10, which extend from the second support plate 10 bridge the total gap width. Alternatively, and as shown in FIG. 11, also the base plate 8 may be provided with such pillars 84 having a length of, for example half the gap width. Then the pillars 86 from the second support plate, which are aligned with those from the base plate also have a length of half the gap width. Another division of the required total length over the pillars 84 and 86 is possible. The pillars can be manufactured by a well-known mask process, whereby in case of FIG. 11 two masks are used, one for the second support plate 10 and one for the base plate 8, respectively. These elements can be in the column direction on support plate 10 and in the row direction on support plate 8 so that at crossings they can touch making alignment unnecessary.

Figure 12:
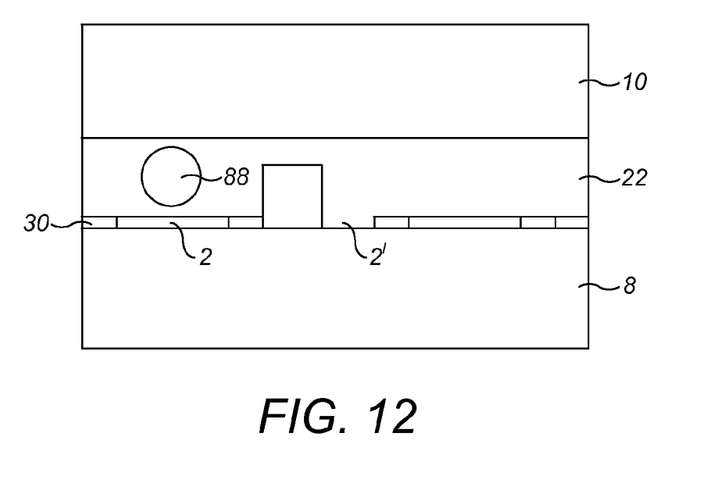
FIG. 12 shows an embodiment wherein the preventers are transparent spheres.

FIG. 12 shows a portion of a preferred embodiment of the electrowetting display wherein the preventers are constituted by free bodies 88 in the space between the second support plate 8 and the base plate 10. In principle these bodies can move through the space. In practice, the bodies are often stabilized in an energetically favourable position; e.g. glass bodies preferentially stay close to the hydrophilic walls. The bodies may have several shapes, but preferentially they are spheres, as shown in FIG. 12. The diameter of these spheres is, for example 25 µm and larger than the maximum height of the oil 20 in an element 2' that is in the state of maximum transmission. The spheres 88 thus prevent the lower surface 40 of the second support plate 10 from touching the oil when a downward force is exerted on this plate.

The spheres may be made of glass or plastics and preferably the refractive index of the sphere material is substantially equal to that of the second fluid 22. Preferably, the spheres also have a density that is substantially equal to that of the second fluid 22.

It is remarked that glass spheres are already used in liquid crystal displays. However the diameter of the spheres in a LCD is equal to the distance between the supporting plates, i.e. the sphere diameter determines this distance, whilst in the electrowetting display the sphere diameter is smaller than the distance between the supporting plates. Moreover, because of the nature of LCD's, the optical path length through a LCD is very critical so that a very large number of spheres are needed to keep this path length constant. In an electrowetting display no severe requirements are set to the path length so that only a small number of spheres are required, for example one sphere per 100 electrowetting elements. In addition, the distribution of the spheres is much less important so the number of spheres per given area may vary largely. Finally, also the size distribution of the spheres does not need to be very mono-disperse, which will lead to cost reductions.

Figure 13A:
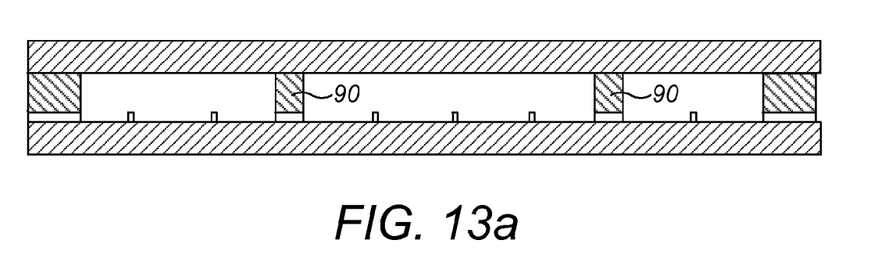
FIGS. 13a and 13b show an embodiment wherein the preventers are arranged outside the elements.
Figure 13B:
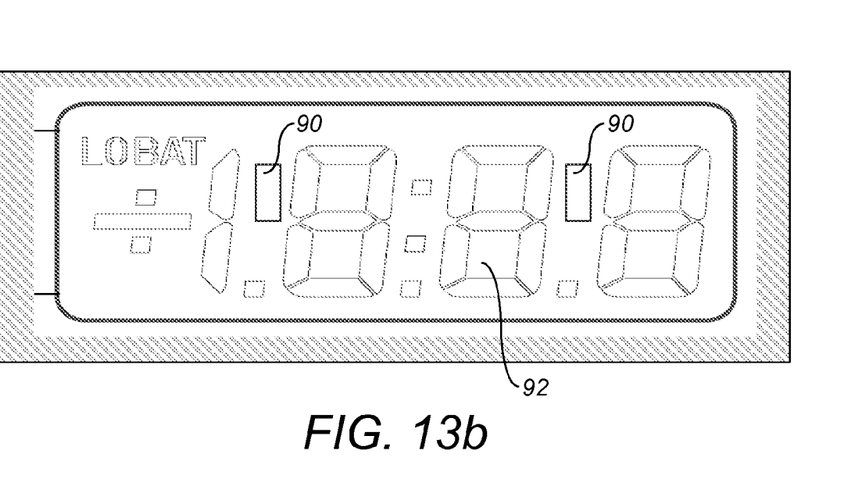

The invention can be implemented not only in elements of an electrowetting display, as described herein above, but also outside the elements. For example in a direct-drive, segmented display the spaces between the digits can be utilised to implement the invention. The advantage of this approach is that one can use the same material and manufacturing process as is used for the sealing of the display. In this embodiment an additional supporting element 90 is created by placing sealing material inside the display. FIG. 13*a* shows a cross-section and FIG. 13*b* shows a top view of digital display wherein supporting elements 90 are provided at positions outside the digits 92. In a further embodiment, the supporting elements are provided at positions inside the digits 92, on top of the electrowetting elements filled with the first fluid. In a preferred embodiment of this type, the outer edges of the supporting element are positioned on top of the electrowetting element walls, to reduce the visibility of the supporting elements. The supporting elements can also be used to achieve a design feature, where the supporting element has a specific shape, e.g. a company logo, or other images.

A fifth class is characterised in that there is a mechanism that switches the display off when the second support plate is bent to an extent that brings it close to the first fluid when in the contracted state. Such a preventing mechanism can for instance be an electrical or optical feedback loop or a capacitance measurement between first and second support plate. When the display is switched off, the first fluid switches back to the off-state which is the thinnest possible layer thickness. As such, it will be more difficult and require a stronger force to bring the second support plate close to or in contact with the first fluid. In addition, the effect that the display switches off can be used to indicate to a user of the display that no further pressure should be applied. The preventive mechanism in the fifth class can be combined with one of the embodiments described in the other classes.

Figure 14:
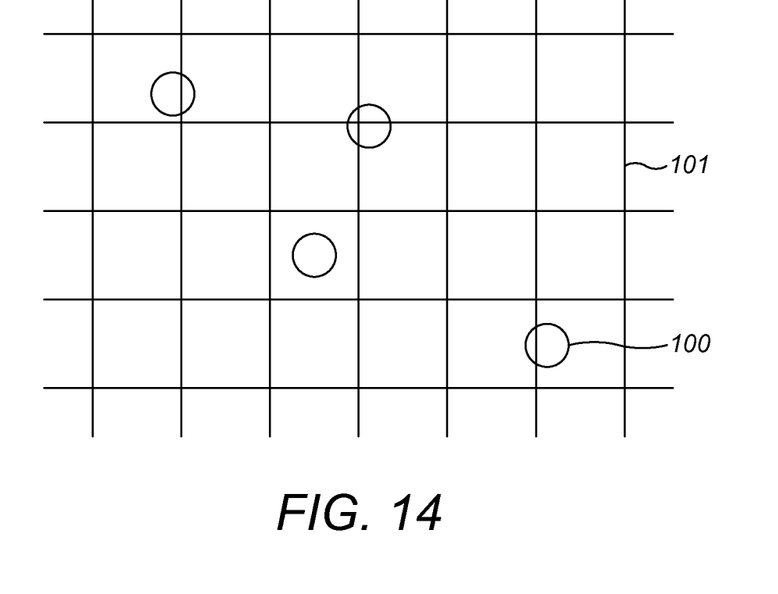
FIG. 14 shows an embodiment with an irregular pattern of spacers.

FIG. 14 shows an embodiment of the pattern of spacers of the sixth class in a plane parallel to the support plates. The spacers 100 are attached to the inner side of the second support plate and are arranged in an irregular pattern. The pattern of element walls on the first support plate are schematically indicated by a grid 101, where each square represents a pixel of the display device. The spacers are disc-shaped protrusions made of a hydrophilic material. In a particular embodiment the spacers have a height of 40 micrometer and a diameter of 150 micrometer and the grid squares have a size of 160 by 160 micrometer. The density is 3 spacers per 25 pixels. The spread in the nearest neighbour distance of the spacers is 250 micrometer, which is larger than the minimum size of the spacer, i.e. larger than 150 micrometer. The spread is defined as the difference between the smallest and largest nearest neighbour distance.

When the size of the spacers is smaller than a minimum dimension of a pixel, a spacer density of at least 8 spacers per $cm^2$ is preferred. The minimum dimension of a square pixel is the length of one side of the pixel. The irregularity of the pattern, the density of the spacers and their size will increase the chance that spacers touch non-zero height element walls when the two support plates are brought close together, thereby reducing the chance that spacers touch the hydrophobic layer of the pixels between the element walls.

When the size of the spacers is larger than a minimum dimension of a pixel, a spacer density of less than 8 per $cm^2$ is possible; a density higher than 2 spacers per $cm^2$ is preferred. Experiments have shown that a density of 4 spacer per $cm^2$ achieves the desired object. This applies e.g. to disc-shaped spacers having a diameter of 200 micrometer where the grid size of the pixel is 160 micrometer. When using rod-shaped spacers, the length of the rods is preferably larger than the maximum dimension of the pixel. The maximum dimension of a rectangular pixel is the length of the diagonal.

Specific embodiments of spacers for pixel measuring 160 by 160 micrometer are as follows. Rod-shaped spacers have a length within the range from 50 to 300 micrometer and a diameter from 25 to 100 micrometer. A particular embodiment uses 4 rods per $cm^2$ of each 250 micrometer length and 75 micrometer diameter. Disc-shaped spacers may have a diameter in the range from 25 to 170 micrometer, the smaller spacers having a density of 10 spacers per $cm^2$, the larger spacers having a density of 3 spacers per $cm^2$.

The height of a spacer is chosen to be smaller than the distance between the second support plate and the first fluid in a contracted state. The distance of two different embodiments of the device is 75 micrometer and 150 micrometer. The height is preferably larger than the height of the first fluid in the contracted state minus the height of the element walls, such that the first fluid will not contact the second support plate even when the spacers have been brought in contact with the element walls. In the embodiment having 75 micrometer distance, the height of the spacers is 40 micrometer; the height of the first fluid in the contracted state is 20 micrometer above the support plate and 16 micrometer above the top of the 4 micrometer high element walls. The spacers have the effect of reducing the tsunami effect and/or preventing the lowered ceiling effect.

The spacers or preventers can be made by depositing bodies of a liquid hydrophilic spacer material, such as photoresist or UV curable adhesive, onto the inner side of the second support plate, by moving one or more dispensers above a stationary support plate, moving the support plate under one or more stationary dispensers or a combination of the two methods. The relative movement between the dispensers and the support plate and the deposition rate determine whether the pattern of spacers becomes regular or irregular.

Figure 15:
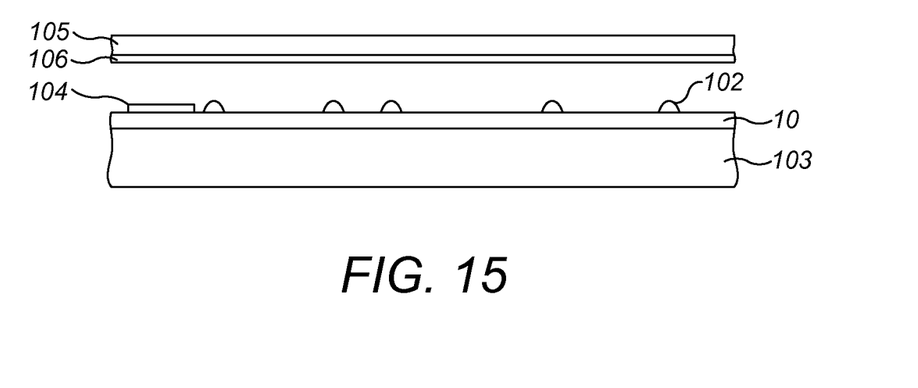
FIG. 15 shows a set-up for providing preventers having an equal height.

The height of the spacers can be controlled using a set-up as shown in FIG. 15. The second support plate 10 provided with bodies or drops of non-cured spacer material 102 is arranged on a chuck 103 for mechanical stability. Several elements 104 having a well-defined height are arranged on the second support plate outside the area onto which the bodies are deposited. The elements may be metal strips having a well defined thickness, e.g. 40 micrometer. A plate 105, preferably transparent, is provided with an anti-adhesion layer 106 for the hydrophilic material of the spacers. The plate is lowered onto the elements 104, thereby flattening the drops 102 of hydrophilic spacer material. Subsequently, the hydrophilic spacer material is cured by irradiating the plates with UV light. After curing the plate 105 is removed.

When the bodies of deposited spacer material are circular, the spacers will be disc-shaped after their height has been reduced by the above method. When the bodies are cured without their height being reduced, the spacers will have the form of a spherical cap. When during deposition of a body the dispenser moves with respect to the support plate, the spacer will have a rod-like shape, which may have a low or high aspect ratio.

An alternative method of making spacers is by depositing solid bodies onto the second support plate in a regular or irregular pattern. The bodies may have any desired form, such as spheres, discs or rods. The material is preferably transparent, having a refractive index similar to that of the second fluid 22; e.g. silicon oxide having a refractive index of 1.45 and water as second fluid having a refractive index of 1.33. Before deposition, the inner side of the second support plate may be covered by a layer of adhesive, which is cured after deposition of the bodies onto this layer. The adhesive is preferably hydrophilic. Alternatively, before deposition the bodies may be covered by an adhesive and after deposition the adhesive is cured. The latter case provides more design freedom for the spacer material, because it need not be hydrophilic.

The spacers may also be made using a photo-lithographic method or screen printing.

All of the preventers and the spacers of the sixth class presented above can be used in electrowetting display devices with one or more switchable layers and in electrowetting display devices with two or more support plates.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A display device comprising picture elements, which are constituted by electrowetting elements having at least one first fluid and a second fluid immiscible with each other within a space between a first support plate and a second support plate, the second fluid being electro-conductive or polar, whereby the first fluid in each element is at an inner side of the first support plate confined by element walls, and the second fluid is shared by a plurality of picture elements, wherein a preventer for preventing first fluid portions from being expelled from its confinement when forces other than electrowetting forces are exerted on this fluid is arranged at an inner side of the second support plate and is constituted by an array of protruding elements having their base on the second support plate, wherein the array of protruding elements has a hydrophilic surface and a height smaller than the distance between the first support plate and the second support plate.

2. A display device as claimed in claim 1, wherein the array is an irregular pattern.

3. A display device as claimed in claim 1, wherein the protruding elements narrow towards the first support plate.

4. A display device as claimed in claim 1, wherein the material of the protruding elements is transparent.

5. A display device as claimed in claim 4, wherein the refractive index of the protruding elements is substantially equal to that of the second fluid.

6. A display device as claimed in claim 1, wherein the protruding elements have a square base.

7. A display device as claimed in claim 1, wherein the spacer elements have a circular base.

8. A display device as claimed in claim 1, wherein the protruding elements are longitudinal ridges which longitudinal dimension is substantially equal to the corresponding dimension of the surface of the second support plate.

9. A display device as claimed in claim 1, wherein each electrowetting element has a transmitting state in which the first fluid is pushed to one side and has a maximum height, and wherein the protruding elements include movement limiting elements at locations corresponding to the element walls on the first support plate, which movement limiting elements extend in a direction perpendicular to the support plates and have a length smaller than the distance between the support plates and larger than the maximum height of the first fluid in an element, when in the transmitting state.

10. A display device as claimed in claim 1, wherein the protruding elements include distance defining elements at locations corresponding to the element walls, which spacer elements extend in a direction perpendicular to the support plates and touch the element walls on the first support plate.

11. A display device as claimed in claim 10, wherein the second support plate is provided with a number of lenses corresponding to a number and location of the distance defining elements.

12. A display device as claimed in claim 1, wherein the protruding elements include first distance defining elements and the first support plate is provided with second distance defining elements aligned with the first distance defining elements, a total length of each first distance defining element and a corresponding one of the second distance defining elements being equal to the distance between the first and second support plate.

13. A display device as claimed in claim 1, wherein the protruding elements include distance-defining elements arranged in one of a first arrangement between the supporting plates at positions outside the electrowetting elements and a second arrangement between the supporting plates at positions on top of the electrowetting elements.

14. A display device as claimed in claim 1, wherein the protruding elements include spacer elements having a height smaller than a distance between the first support plate and the second support plate and arranged in an irregular pattern.

15. A display device as claimed in claim 14, wherein the first fluid is movable to a contracted state in which the first fluid has a maximum height, and wherein a height of the spacer elements is smaller than a distance between the second support plate and the first fluid in the contracted state.

16. A display device as claimed in claim 15, wherein a height of the spacer element is larger than the height of the first fluid in the contracted state minus a height of the element walls.

17. A display device as claimed in claim 14, wherein the spacer elements have a dimension in a plane of the second support plate larger than a minimum dimension in said plane of the picture element.

18. A display device as claimed in claim 14, wherein there is at least one spacer element per eight picture elements on average.

19. A display device as claimed in claim 14, wherein the spacer elements have a sphere, disc or rod shape.

20. A display device as claimed in claim 14, wherein the spacer elements are hydrophilic.

21. A display device comprising picture elements, which are constituted by electrowetting elements having at least one first fluid and a second fluid immiscible with each other within a space between a first support plate and a second support plate, the second fluid being electro-conductive or polar, whereby the first fluid in each element is at an inner side of the first support plate confined by element walls, and the second fluid is shared by a plurality of picture elements, at least one of said electrowetting elements being configurable to a transmitting state in which the first fluid is moved to a contracted state having a maximum height, wherein a preventer is arranged for preventing first fluid portions from being expelled from its confinement when forces other than electrowetting forces are exerted on this fluid, wherein the preventer includes free bodies arranged in the space and having a dimension in the direction perpendicular to the support plates larger than the maximum height of the first fluid in the electrowetting element when in the transmitting state.

22. A display device as claimed in claim 21, wherein the free bodies are made of a transparent material.

23. A display device as claimed in claim 22, wherein the free bodies have a refractive index substantially equal to that of the second fluid.

24. A display device as claimed in claim 21, wherein the free bodies are made of a material that is more wettable to the second fluid.

25. A display device as claimed in claim 21, wherein the free bodies are spheres.

26. A display device as claimed in claim 21, wherein the free bodies are rods.

27. A display device as claimed in claim 26, wherein the rods have a length that is larger than the diagonal of the electrowetting elements.

28. A display device comprising picture elements, which are constituted by electrowetting elements having at least one first fluid and a second fluid immiscible with each other within a space between a first support plate and a second support plate, the second fluid being electro-conductive or polar, whereby the first fluid in each element is at an inner side of the first support plate confined by element walls, and the second fluid is shared by a plurality of picture elements, the first fluid being movable to a contracted state in which the first fluid has a maximum height, wherein a preventer for preventing first fluid portions from being expelled from its confinement when forces other than electrowetting forces are exerted on this fluid consists of a mechanism that switches the display off when the second support plate is bent to an extent that brings the inner surface of the support plate close to the first fluid when in the contracted state.

* * * * *